US012752784B2

(12) United States Patent
Toda

(10) Patent No.: US 12,752,784 B2
(45) Date of Patent: Oct. 6, 2026

(54) VEHICLE CONTROL APPARATUS, VEHICLE CONTROL METHOD, AND STORAGE MEDIUM

(71) Applicant: TOYOTA JIDOSHA KABUSHIKI KAISHA, Toyota (JP)

(72) Inventor: Yoshinari Toda, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 19/028,255

(22) Filed: Jan. 17, 2025

(65) Prior Publication Data

US 2025/0256715 A1 Aug. 14, 2025

(30) Foreign Application Priority Data

Feb. 8, 2024 (JP) ................................ 2024-017878

(51) Int. Cl.
*B60W 30/14* (2006.01)
*G06V 20/56* (2022.01)

(52) U.S. Cl.
CPC ........... *B60W 30/143* (2013.01); *G06V 20/56* (2022.01); *B60W 2420/403* (2013.01); *B60W 2540/106* (2013.01); *B60W 2554/802* (2020.02); *B60W 2556/40* (2020.02); *G06V 2201/07* (2022.01)

(58) Field of Classification Search
CPC ......... B60W 30/143; B60W 2420/403; B60W 2540/106; B60W 2554/802; B60W 2556/40; B60W 2540/10; B60W 2720/10; B60W 30/16; G06V 20/56; G06V 2201/07
See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |

(Continued)

FOREIGN PATENT DOCUMENTS

| | | | |
|---|---|---|---|
| JP | 2009161057 | A | 7/2009 |
| JP | 2009196487 | A | 9/2009 |

*Primary Examiner* — Kito R Robinson
*Assistant Examiner* — Tanya C Sienko
(74) *Attorney, Agent, or Firm* — Hunton Andrews Kurth LLP

(57) ABSTRACT

A vehicle control apparatus starts deceleration control to decelerate a vehicle in a case where the distance between a deceleration target ahead of the vehicle and the vehicle based on map data is acquired and a deceleration start condition that the distance is less than or equal to a first distance is satisfied. The vehicle control apparatus is configured to accelerate the vehicle based on the operation amount of an acceleration operator of the vehicle and determine whether a deceleration end condition is satisfied in a case where the acceleration operator is operated during the execution of the deceleration control, end the deceleration control in a case where the deceleration end condition is satisfied, and resume the deceleration control in a case where the operation on the acceleration operator ends in a case where the deceleration end condition is not satisfied.

5 Claims, 4 Drawing Sheets

(56) References Cited

U.S. PATENT DOCUMENTS

| | | | | |
|---|---|---|---|---|
| 10,118,617 | B2 | 11/2018 | Urano et al. | |
| 10,486,698 | B2 | 11/2019 | Masui et al. | |
| 11,691,647 | B2 * | 7/2023 | Fujita | B60W 10/20<br>701/26 |
| 2019/0061744 | A1 * | 2/2019 | Ozawa | B60W 10/06 |
| 2019/0295419 | A1 | 9/2019 | Tosa et al. | |
| 2021/0122377 | A1 * | 4/2021 | Huh | B60W 40/04 |
| 2022/0194226 | A1 * | 6/2022 | Ide | B60W 50/10 |
| 2024/0157938 | A1 * | 5/2024 | Toda | B60W 50/14 |

* cited by examiner

VEHICLE CONTROL APPARATUS, VEHICLE CONTROL METHOD, AND STORAGE MEDIUM

CROSS-REFERENCE TO RELATED APPLICATION

This application claims priority to Japanese Patent Application No. 2024-017878 filed on Feb. 8, 2024, incorporated herein by reference in its entirety.

BACKGROUND

1. Technical Field

The present disclosure relates to a vehicle control apparatus that starts deceleration control to decelerate a vehicle in a case where a deceleration start condition that the distance between a deceleration target and the vehicle is less than or equal to a first distance is satisfied, a vehicle control method that starts deceleration control in a case where the deceleration start condition is satisfied, and a storage medium storing a program that starts deceleration control in a case where the deceleration start condition is satisfied.

2. Description of Related Art

Vehicle control apparatuses that each execute travel assist control (sometimes referred to as "adaptive cruise control (ACC)") have been known in the past. Such a vehicle control apparatus executes constant speed control as travel assist control in a case where there is no preceding vehicle, and executes follow-up control as travel assist control in a case where there is a preceding vehicle. The constant speed control is control to cause a vehicle to travel such that the vehicle speed, that indicates the speed of the vehicle, coincides with setting vehicle speed set in advance. The follow-up control is control to cause a vehicle to travel such that the vehicle follows a preceding vehicle.

For example, a vehicle control apparatus (referred to as a "conventional apparatus" below) described in Japanese Unexamined Patent Application Publication No. 2009-161057 executes acceleration restraint control to restrain a vehicle from accelerating in a case where the vehicle is located near a toll gate, an intersection, and the like when travel assist control transitions from follow-up control to constant speed control. In a case where an acceleration operator (accelerator pedal) is operated during the execution of the acceleration restraint control, the conventional apparatus suspends the acceleration restraint control and accelerates the vehicle according to the operation amount of the acceleration operator. In a case where the operation on the acceleration operator ends, the conventional apparatus resumes the acceleration restraint control. The conventional apparatus accelerates the vehicle at smaller acceleration under the resumed acceleration restraint control than acceleration under normal acceleration restraint control.

SUMMARY

The inventor and the like of the present application have studied a vehicle control apparatus that executes deceleration control to decelerate a vehicle in a case where the distance between a deceleration target such as a toll gate and an intersection and the vehicle is less than or equal to a predetermined start distance. Such a vehicle control apparatus suspends the deceleration control and accelerates the vehicle in response to the operation amount of an acceleration operator as with the conventional apparatus in a case where the acceleration operator is operated during the execution of the deceleration control.

In a case where a driver operates an acceleration operator during the execution of deceleration control, the driver is highly likely to have any of the following intention 1 and intention 2.

- intention 1: intention of accelerating a vehicle because deceleration control has been started by mistake
- intention 2: intention of adjusting vehicle speed during deceleration control In a case where the driver operates the acceleration operator with the intention 1, it is highly likely that the driver does not wish to resume the deceleration control when the operation on the acceleration operator ends because the deceleration control has been started by mistake. Meanwhile, in a case where the driver operates the acceleration operator with the intention 2, it is highly likely that the driver wishes to execute deceleration control again when the operation on the acceleration operator ends.

The conventional apparatus resumes the acceleration restraint control without determining with which of the intentions the driver operates the acceleration operator when the operation on the acceleration operator ends. It is therefore likely to be impossible to offer vehicle travel assist compliant with the intention of the driver.

The present disclosure has been devised to address the problem described above. That is, one of objects of the present disclosure is to provide a vehicle control apparatus that makes it more likely that vehicle travel assist compliant with the intention of a driver operating an acceleration operator is offered.

A vehicle control apparatus (referred to as "the present apparatus" below) according to the present disclosure starts deceleration control (step 435, step 440 to step 450) to decelerate a vehicle in a case where the distance between a deceleration target ahead of the vehicle and the vehicle based on map data (26*b*) is acquired and a deceleration start condition that the distance is less than or equal to a first distance is satisfied ("Yes" in step 430).

The vehicle control apparatus is configured to accelerate the vehicle based on the operation amount of an acceleration operator of the vehicle (step 460) and determine whether a deceleration end condition is satisfied (step 470, step 510) in a case where the acceleration operator is operated during the execution of the deceleration control ("Yes" in step 415, "Yes" in step 465), end the deceleration control (step 520) in a case where the deceleration end condition is satisfied ("Yes" in step 510), and resume the deceleration control in a case where the operation on the acceleration operator ends in a case where the deceleration end condition is not satisfied ("No" in step 510). The deceleration end condition includes at least a first condition that the time from the start of the deceleration control to the operation on the acceleration operator is less than or equal to a threshold time.

In a case where deceleration control has been started by mistake, a driver is highly likely to operate an acceleration operator immediately after the deceleration control is started. In the case, the driver does not wish to resume the deceleration control after the operation on the acceleration operator ends. The present apparatus ends the deceleration control in a case where a deceleration end condition including at least a first condition that the time from the start of the deceleration control to the operation on the acceleration operator is less than or equal to a threshold time is satisfied.

It is therefore possible to make it more likely that vehicle travel assist compliant with the intention of the driver is offered.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
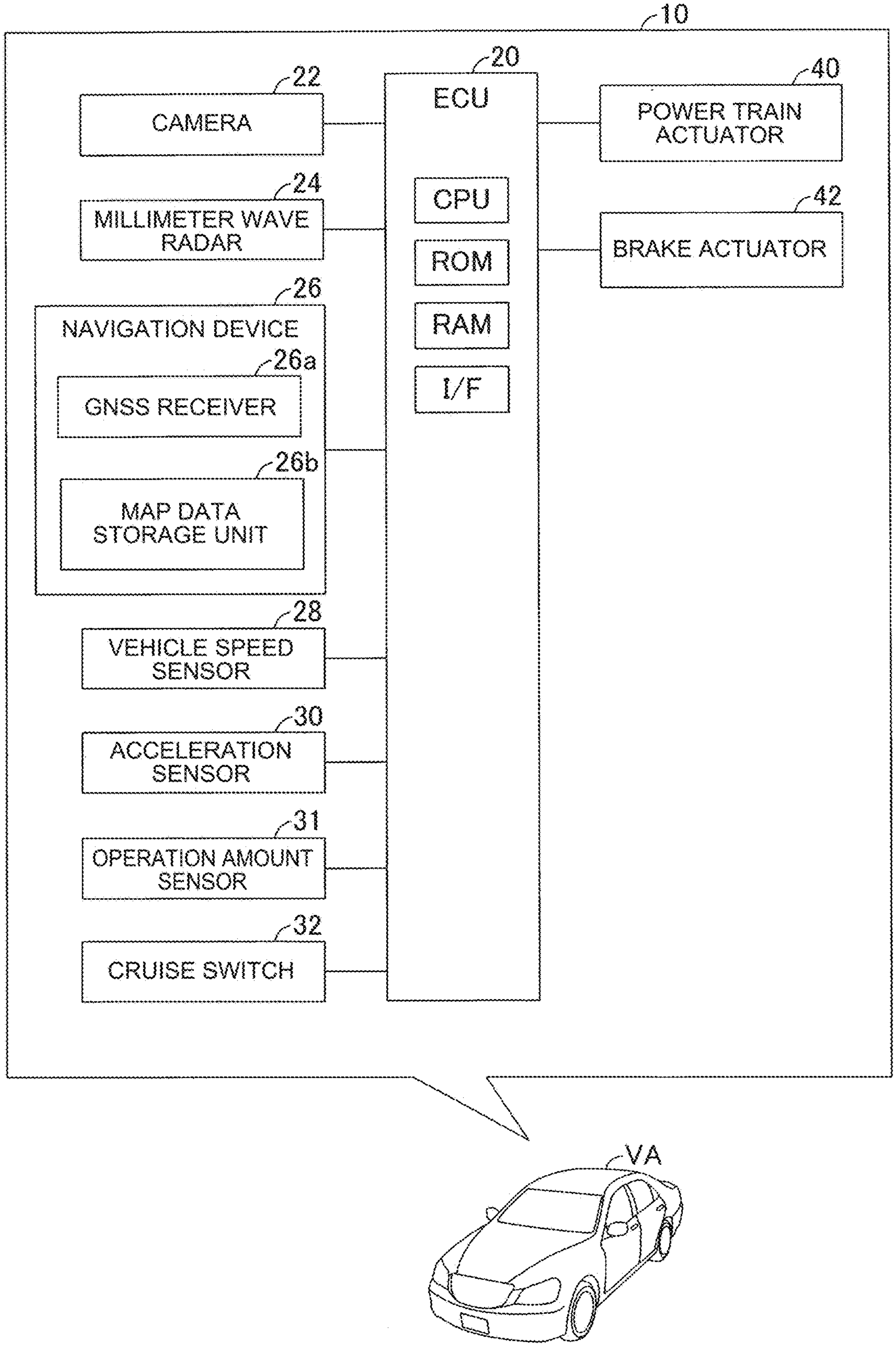
FIG. 1 is a schematic system configuration diagram of a vehicle control apparatus according to an embodiment of the present disclosure.

As illustrated in FIG. 1, a vehicle control apparatus 10 (referred to as "the present apparatus 10" below) according to the present embodiment is applied to a vehicle VA and includes the components illustrated in FIG. 1.

An ECU 20 executes travel assist control that is a type of automated driving. Under the travel assist control, the ECU 20 executes constant speed control in a case where there is no preceding vehicle ahead of the vehicle VA, and executes follow-up control in a case where there is a preceding vehicle ahead of the vehicle VA. The constant speed control is control to cause the vehicle VA to travel such that vehicle speed Vs coincides with setting vehicle speed Vset. The vehicle speed Vs indicates the speed of the vehicle VA. The follow-up control is control to cause the vehicle VA to travel such that an inter-vehicle distance Dv between the preceding vehicle and the vehicle VA coincides with a setting distance Dset. Such travel assist control has been known as adaptive cruise control (ACC) and cruise control.

In the present specification, the "ECU 20" is an electronic control device including a microcomputer as a main unit. The ECU 20 is also referred to as a control unit, a controller, and a computer. The microcomputer includes a CPU (processor), a ROM, a RAM, an interface, and the like. A function implemented by the ECU 20 may also be implemented by a plurality of ECUs.

A camera 22 acquires image data by imaging a view ahead of the vehicle VA. The ECU 20 acquires the image data from the camera 22.

The millimeter wave radar 24 transmits a millimeter wave ahead of the vehicle VA. The millimeter wave radar 24 receives a reflection wave obtained by the transmitted millimeter wave being reflected by an object, thereby identifying the "position of the object relative to the vehicle VA" and "speed Vr of the object relative to the vehicle VA". The ECU 20 acquires radar object information from the millimeter wave radar 24. The radar object information includes the position and the speed Vr of the object relative to the vehicle VA.

A navigation device 26 includes a GNSS receiver 26*a* and a map data storage unit 26*b*. The GNSS receiver 26*a* receives signals from a plurality of artificial satellites and identifies the current position (latitude and longitude) of the vehicle VA based on the received signals. The map data storage unit 26*b* stores map data. The position of a deceleration target DO such as a "toll gate of an expressway" and an intersection is registered in the map data.

A vehicle speed sensor 28 detects the vehicle speed Vs. An acceleration sensor 30 detects acceleration G of the vehicle VA in the front-rear axial direction. An operation amount sensor 31 detects the operation amount (stepping amount) of the acceleration operator (accelerator pedal) of the vehicle VA. The ECU 20 acquires the detection values of the sensors.

A cruise switch 32 is operated by a driver to start travel assist control or end travel assist control.

A power train actuator 40 changes driving force that is generated by a driving device (e.g., an internal combustion engine and/or an electric motor) of the vehicle VA. A brake actuator 42 controls braking force that is imparted to the vehicle VA.

Overview of Actuation

In a case where a deceleration start condition described below is satisfied during the execution of travel assist control (ACC), the ECU 20 of the present apparatus 10 starts deceleration control to decelerate the vehicle VA.

Deceleration Start Condition

The ECU 20 refers to the map data stored in the map data storage unit 26*b* and identifies the deceleration target DO that is present in the traveling direction of the vehicle VA from the current position of the vehicle VA and the closest to the vehicle VA. The ECU 20 then acquires a distance D between the deceleration target DO and the vehicle VA based on the position of the deceleration target DO and the current position of the vehicle VA. In a case where the distance D is less than or equal to a first distance D1th, the ECU 20 determines that the deceleration start condition is satisfied.

As an example, under deceleration control, the ECU 20 decelerates the vehicle VA to cause the vehicle VA to stop (i.e., to cause the vehicle speed Vs to be "0 km/h") when the vehicle VA reaches the position a predetermined distance before the deceleration target DO. It is to be noted that the deceleration control is not limited to the example. For example, under deceleration control, the ECU 20 may decelerate the vehicle VA at constant deceleration Gpre set in advance.

In a case where a driver operates the acceleration operator (accelerator pedal) during the execution of travel assist control or deceleration control, the ECU 20 suspends the travel assist control or the deceleration control and accelerates the vehicle VA based on the operation amount of the acceleration operator.

Furthermore, in the case, the ECU 20 determines whether or not a deceleration end condition that both a condition 1 and a condition 2 are satisfied is satisfied.

- condition 1: the deceleration target DO is not recognized based on image data.
- condition 2: an elapsed time T from a start of deceleration control to an operation on the acceleration operator is less than or equal to a threshold time Tth.

It is to be noted that the condition 1 is sometimes referred to a "second condition" and the condition 2 is sometimes referred to as a "first condition".

In a case where deceleration control has been started by mistake, it is highly likely that a deceleration target is registered in the map data, but there is no deceleration target in fact. When deceleration control is started by mistake, a driver is highly likely to operate an acceleration operator immediately after the deceleration control is started. Therefore, in a case where both the condition 1 and the condition 2 are satisfied (i.e., in a case where the deceleration end condition is satisfied), the driver is highly likely to operate the acceleration operator with the intention (the intention 1) of wishing to accelerate the vehicle VA because the deceleration control has been started by mistake.

In a case where the deceleration end condition is satisfied, it is highly likely that the driver does not wish to resume the deceleration control after the operation on the acceleration operator ends because it is highly likely that deceleration control is started by mistake. The ECU 20 therefore ends the deceleration control in a case where the deceleration end condition is satisfied, and executes travel assist control in a case where the operation on the acceleration operator ends.

In contrast, in a case where the deceleration end condition is not satisfied, the driver is less likely to operate the acceleration operator with the intention 1. The driver is highly likely to operate the acceleration operator with the intention (the intention 2) of wishing to adjust the vehicle speed Vs during the deceleration control. In the case, the driver considers that the deceleration control is going to be resumed after the operation on the acceleration operator to adjust the vehicle speed Vs ends. Thus, in a case where the deceleration end condition is not satisfied, the ECU 20 resumes the deceleration control in a case where the operation on the acceleration operator ends.

The present apparatus 10 therefore makes it possible to make it more likely that vehicle travel assist compliant with the intention of a driver operating an acceleration operator is offered.

It is to be noted that, in a case where the deceleration end condition is satisfied, but an exception condition that the distance D is less than a second distance D2th shorter than the first distance D1th is satisfied, the ECU 20 resumes the deceleration control without ending the deceleration control after the operation on the acceleration operator ends. This is because the driver is highly likely to feel extremely uneasy if wishing to resume the deceleration control when the deceleration control ends after an operation on the acceleration operator ends in a case where the distance D is less than the second distance D2th.

Actuation Example

Figure 2:
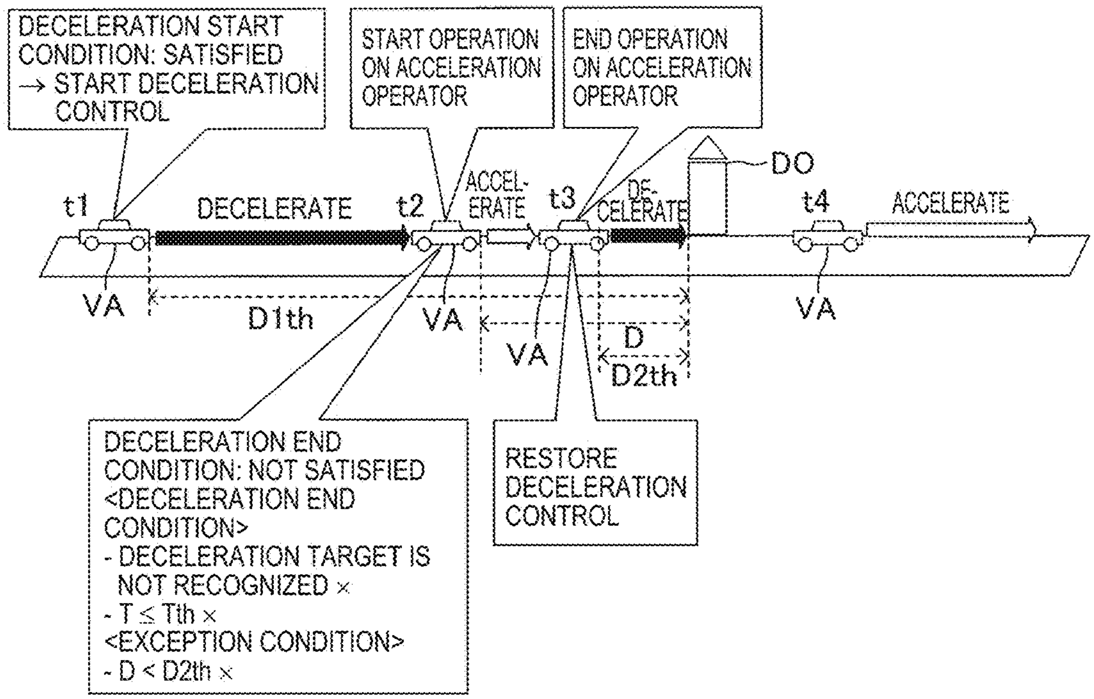
FIG. 2 is an explanatory diagram of an actuation example of the vehicle control apparatus according to the embodiment of the present disclosure in a case where a deceleration end condition is not satisfied.

An actuation example of the present apparatus 10 in a case where the deceleration end condition is not satisfied will be described with reference to FIG. 2.

At time t1, the distance D is equal to the first distance D1th and the deceleration start condition is satisfied. The ECU 20 thus starts deceleration control and starts to decelerate the vehicle VA at time t1.

A driver starts an operation on the acceleration operator at time t2 at which the deceleration control is in execution and the driver ends the operation on the acceleration operator at time t3. The ECU 20 accelerates the vehicle VA based on the operation amount of the acceleration operator in the period from time t2 to time t3.

At time t2, the ECU 20 determines whether or not the deceleration end condition is satisfied. The following assumptions are considered to hold at time t2.

assumption 1: the ECU 20 recognizes the deceleration target DO based on image data.

assumption 2: the elapsed time T is longer than the threshold time Tth.

assumption 3: the distance D is greater than or equal to the second distance D2th.

The deceleration end condition is not satisfied because of the assumption 1 and the assumption 2. Furthermore, the exception condition is not satisfied because of the assumption 3.

Thus, when the operation on the acceleration operator ends at time t3, the ECU 20 returns to the deceleration control (resumes the deceleration control) and decelerates the vehicle VA.

The vehicle VA has passed the deceleration target DO before time t4 and the ECU 20 is executing constant speed control as travel assist control at time t4. The vehicle VA therefore accelerates such that vehicle speed Vs coincides with the setting vehicle speed Vset.

Figure 3:
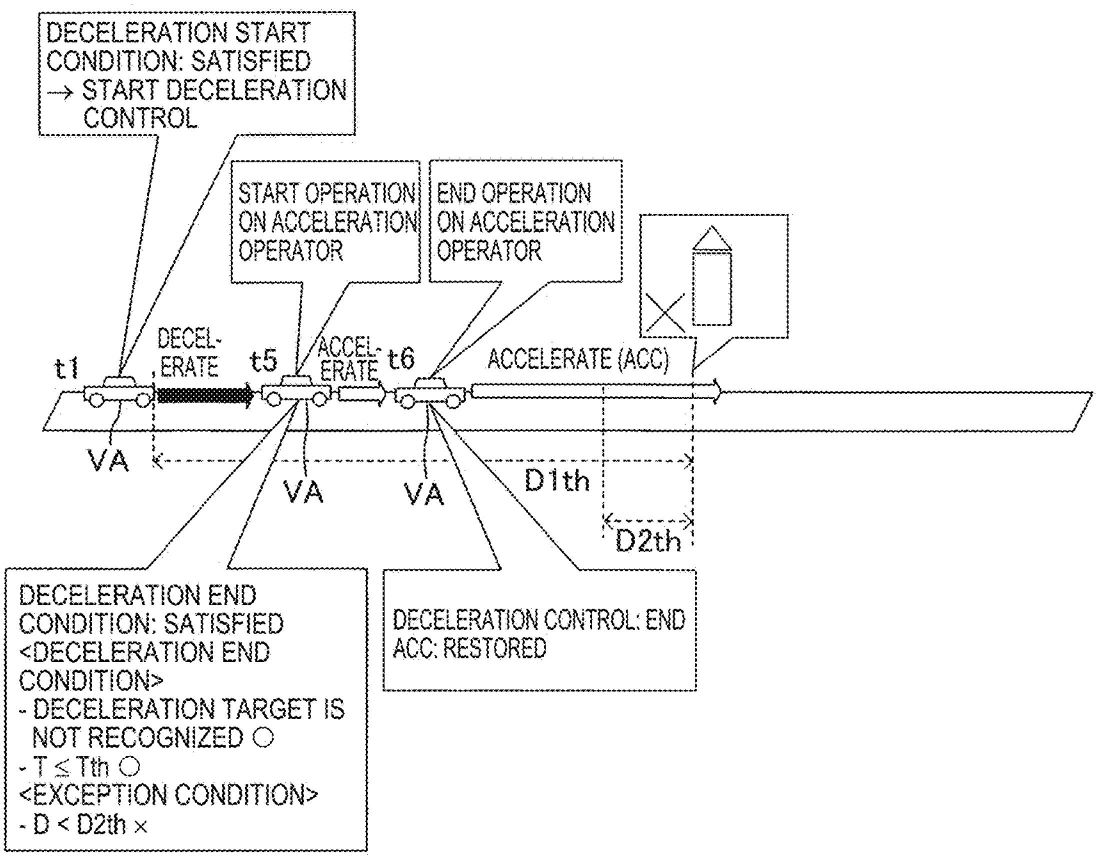
FIG. 3 is an explanatory diagram of an actuation example of the vehicle control apparatus according to the embodiment of the present disclosure in a case where the deceleration end condition is satisfied.

An actuation example of the present apparatus 10 in a case where the deceleration end condition is satisfied will be described with reference to FIG. 3.

At time t1, the deceleration start condition is satisfied and the ECU 20 starts deceleration control.

At time t5, an operation on the acceleration operator is started and the ECU 20 determines whether or not the deceleration end condition is satisfied. The following assumptions are considered to hold at time t5.

assumption 4: the ECU 20 does not recognize the deceleration target DO based on image data.

assumption 5: the elapsed time T is less than or equal to the threshold time Tth.

assumption 6: the distance D is greater than or equal to the second distance D2th.

Therefore, the deceleration end condition is satisfied because of the assumption 4 and the assumption 5 and the exception condition is not satisfied because of the assumption 6. At time t6, the operation on the acceleration operator ends, and the ECU 20 ends the deceleration control and returns to the travel assist control. There is no preceding vehicle at time t6, and the ECU 20 thus executes constant speed control as travel assist control and accelerates the vehicle VA.

Specific Actuation

Figure 4:
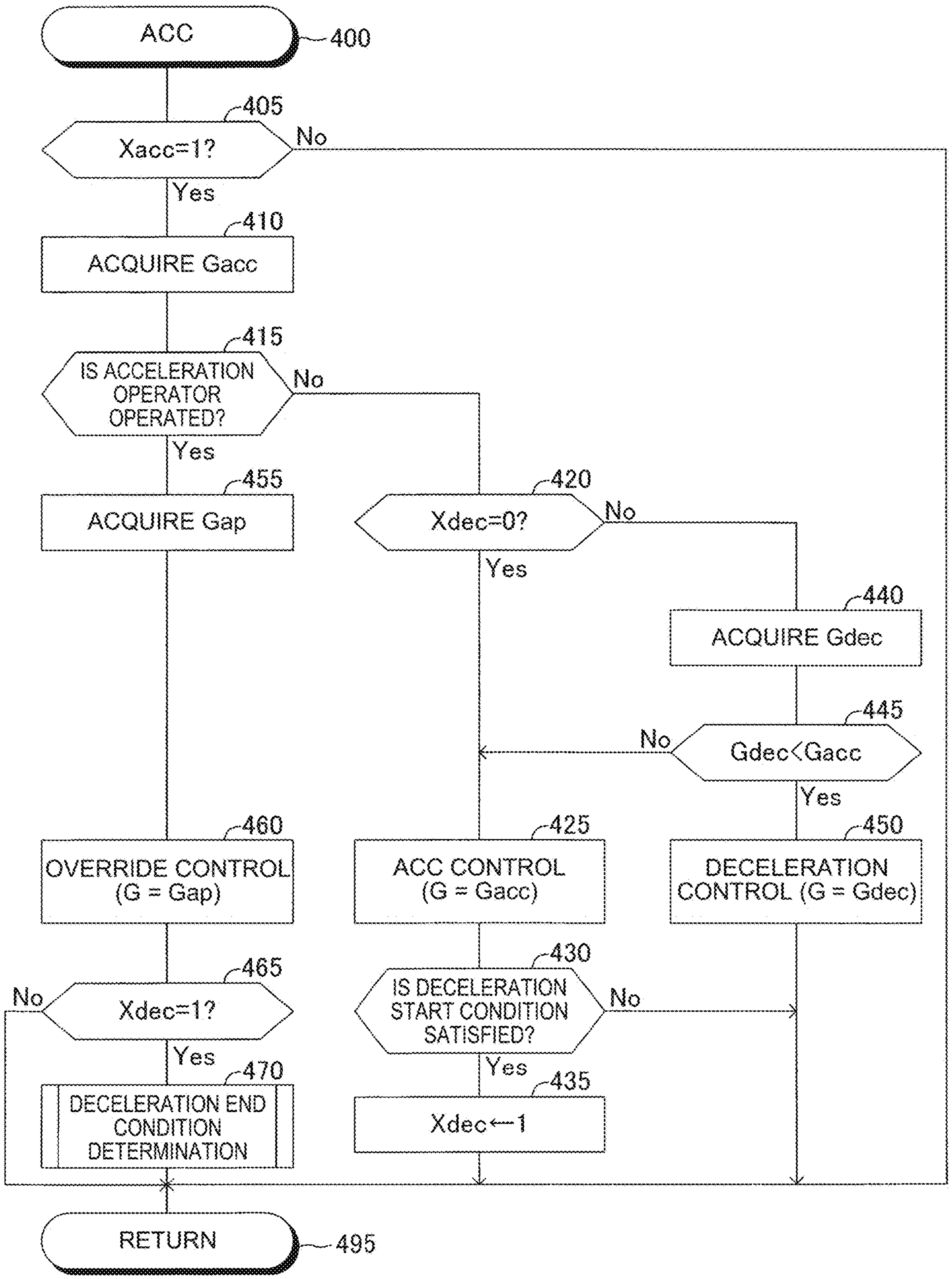
FIG. 4 is a flowchart of an ACC routine that is executed by a CPU of an ECU illustrated in FIG. 1.
Figure 5:
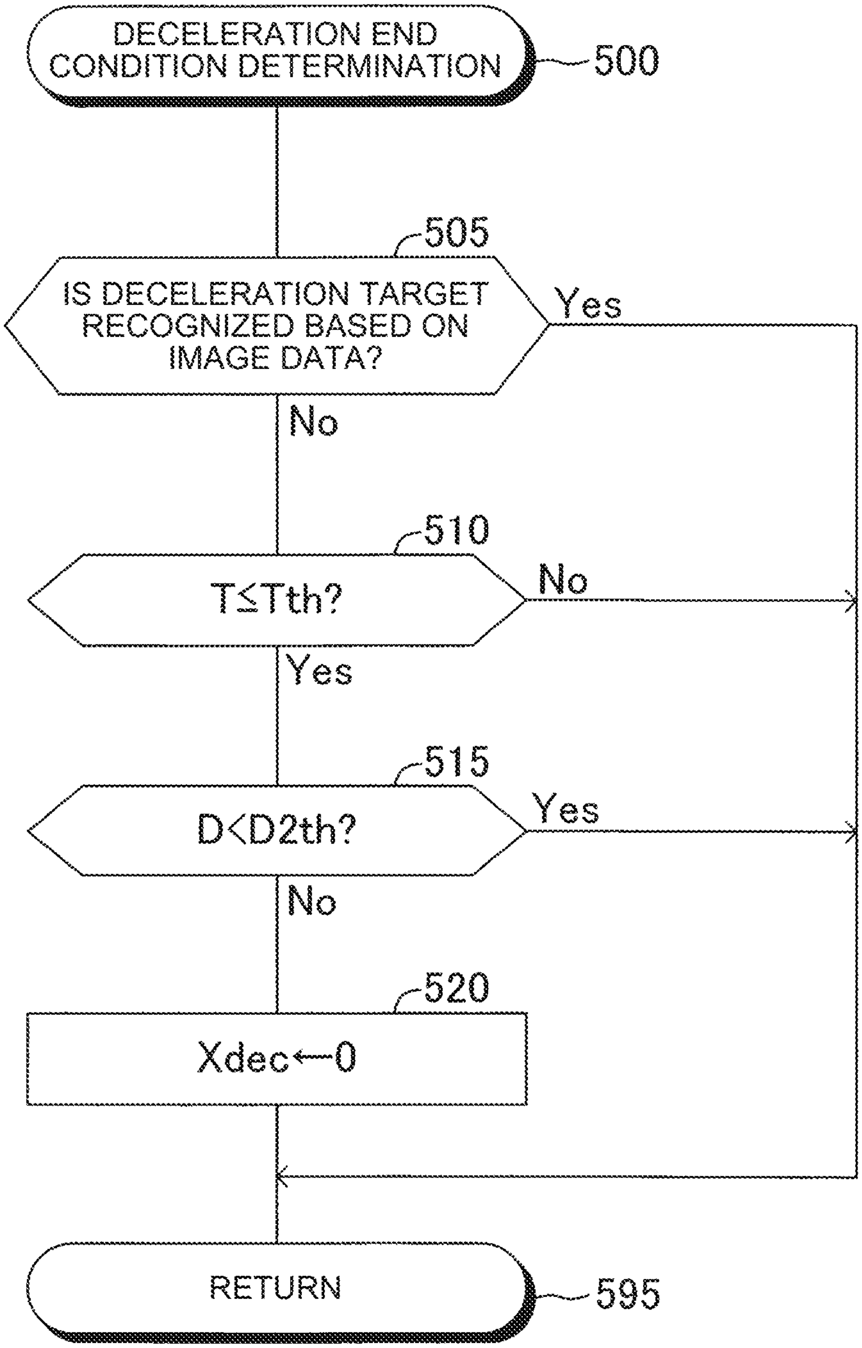
FIG. 5 is a flowchart of a deceleration end condition determination subroutine that is executed by the CPU of the ECU illustrated in FIG. 1.

The CPU of the ECU 20 executes the routines illustrated as the flowcharts of FIG. 4 and FIG. 5 whenever a predetermined time passes.

ACC Routine

At the appropriate time, the CPU of the ECU 20 starts processing from step 400 in FIG. 4 and the CPU determines in step 405 whether or not an ACC flag Xacc is "1".

In a case where the cruise switch 32 is operated when the ACC flag Xacc is "0", the ACC flag Xacc is set to "1". In a case where the cruise switch 32 is operated when the ACC flag Xacc is "1", the ACC flag Xacc is set to "0". Furthermore, the value of the ACC flag Xacc is set to "0" in an initial routine. The initial routine is executed by the CPU when the ignition key switch (not illustrated) of the vehicle VA is changed from the off-position to the on-position.

In a case where the ACC flag Xacc is "0", the CPU determines "No" in step 405. The processing proceeds to step 495 and the CPU ends the routine temporarily.

In a case where the ACC flag Xacc is "1", the CPU determines "Yes" in step 405 and executes step 410 and step 415.

step 410: the CPU acquires ACC target acceleration Gacc.

Described in detail, the CPU determines based on image data and radar object information whether or not there is a preceding vehicle. The preceding vehicle is a vehicle that is located within a predetermined distance ahead of the vehicle VA and travels in the same lane as the lane in which the vehicle VA travels.

In a case where there is no preceding vehicle, the CPU acquires constant speed target acceleration Gset as the ACC target acceleration Gacc by applying the setting vehicle speed Vset and the vehicle speed Vs to the following Expression (1). The constant speed target acceleration Gset causes the vehicle speed Vs to coincide with the setting vehicle speed Vset.

$$Gset = k1 \times (Vset - Vs) \tag{1}$$

In Expression (1), k1 represents a predetermined gain (coefficient).

In a case where there is a preceding vehicle, the CPU acquires follow-up target acceleration Gflw as the ACC target acceleration Gacc by applying the setting vehicle speed Vset, the vehicle speed Vs, and the relative speed Vr of the preceding vehicle to the following Expression (2). The follow-up target acceleration Gflw causes the inter-vehicle distance Dv to coincide with the setting distance Dset.

$$Gflw = ka1 \times (k2 \times (Dv - Dset) + k3 \times Vr) \tag{2}$$

In Expression (2), ka1, k2, and k3 represent predetermined gains (coefficients).

step 415: the CPU determines based on the detection value of the operation amount sensor 31 whether or not the acceleration operator is operated.

In a case where the acceleration operator is not operated, the CPU determines "No" in step 415 and the processing proceeds to step 420. In step 420, the CPU determines whether or not a deceleration flag Xdec is "0".

The deceleration flag Xdec is set to "1" in a case where deceleration control starts, and is set to "0" in a case where deceleration control ends. It is to be noted that the deceleration flag Xdec is set to "O" in a case where the ACC flag Xacc is set to "1" and in the initial routine.

In a case where the deceleration flag Xdec is "0", the CPU determines "Yes" in step 420 and executes step 425 and step 430.

step 425: the CPU executes ACC control.

Described in detail, the CPU controls the power train actuator 40 and the brake actuator 42 such that the acceleration G coincides with the ACC target acceleration Gacc.

step 430: the CPU determines whether or not the deceleration start condition is satisfied.

Described in detail, the CPU refers to the map data and acquires the distance D between the deceleration target DO and the vehicle VA. In a case where the distance D is less than or equal to the first distance D1th, the CPU determines that the deceleration start condition is satisfied.

In a case where the deceleration start condition is not satisfied, the CPU determines "No" in step 430. The processing proceeds to step 495 and the CPU ends the routine temporarily.

In a case where the deceleration start condition is satisfied, the CPU determines "Yes" in step 430. The processing proceeds to step 435 and the CPU sets the deceleration flag Xdec to "1". Thereafter, the processing proceeds to step 495 and the CPU ends the routine temporarily.

In a case where the deceleration flag Xdec is "1" when the processing proceeds to step 420, the CPU determines "Yes" in step 420 and executes step 440 and step 445.

step 440: the CPU acquires deceleration target acceleration Gdec.

Described in detail, the CPU acquires the deceleration target acceleration Gdec for the vehicle VA to stop a predetermined distance before the deceleration target DO.

step 445: the CPU determines whether or not the deceleration target acceleration Gdec is less than the ACC target acceleration Gacc (i.e., whether the signed value of Gdec is less than the signed value of Gacc).

In the present embodiment, in a case where the vehicle VA travels forward, the acceleration G has a positive value. In a case where the vehicle VA travels rearward, the acceleration G has a negative value.

In a case where the deceleration target acceleration Gdec is less than the ACC target acceleration Gacc, the CPU determines "Yes" in step 445 and the processing proceeds to step 450. In step 450, the CPU executes deceleration control. Described in detail, the CPU controls the power train actuator 40 and the brake actuator 42 such that the acceleration G coincides with the deceleration target acceleration Gdec. Thereafter, the processing proceeds to step 495 and the CPU ends the routine temporarily.

In contrast, in a case where the deceleration target acceleration Gdec is greater than or equal to the ACC target acceleration Gacc, the CPU determines "No" in step 445 and the processing proceeds to step 425.

In a case where the acceleration operator is operated when the processing proceeds to step 415, the CPU determines "Yes" in step 415 and executes step 455 to step 465.

step 455: the CPU acquires operation acceleration Gap based on an operation amount AP of the acceleration operator.

step 460: the CPU executes override control.

If described in detail, the CPU controls the power train actuator 40 and the brake actuator 42 such that the acceleration G coincides with the operation acceleration Gap.

step 465: the CPU determines whether or not the deceleration flag Xdec is "1".

In a case where the deceleration flag Xdec is "1", the CPU determines "Yes" in step 465 and the processing proceeds to step 470. In step 470, the CPU executes a deceleration end condition determination subroutine. In the deceleration end condition determination subroutine, the CPU determines whether or not the deceleration end condition is satisfied. Details of the deceleration end condition determination subroutine will be described below. Thereafter, the processing proceeds to step 495 and the CPU ends the routine temporarily.

In a case where the deceleration flag Xdec is "0", the CPU determines "No" in step 465. The processing proceeds to step 495 and the CPU ends the routine temporarily.

Deceleration End Condition Determination Subroutine

When the processing proceeds to step 470 in FIG. 4, the CPU starts processing from step 500 in FIG. 5 and the processing proceeds to step 505. In step 505, the CPU determines based on image data whether or not the deceleration target DO is recognizable. If described in detail, in a case where the image data includes an image similar to an image of the deceleration target DO registered in advance, the CPU recognizes the deceleration target DO based on the image data.

In a case where the deceleration target DO is not recognized based on the image data (i.e., in a case where the condition 1 is satisfied), the CPU determines "No" in step 505 and the processing proceeds to step 510. In step 510, the CPU determines whether or not the elapsed time T is less than or equal to the threshold time Tth.

In a case where the elapsed time T is less than or equal to the threshold time Tth (i.e., in a case where the condition 2 is satisfied), the deceleration end condition is satisfied. In the case, the CPU determines "Yes" in step 510 and the processing proceeds to step 515. In step 515, the CPU determines whether or not the distance D is less than the second distance D2th.

In a case where the distance D is greater than or equal to the second distance D2th (i.e., in a case where the exception condition is not satisfied), the CPU determines "No" in step 515 and the processing proceeds to step 520. In step 520, the CPU sets the deceleration flag Xdec to "0". The processing proceeds to step 595 and the CPU ends the routine temporarily. Thereafter, the processing proceeds to step 495 illustrated in FIG. 4. As a result, in a case where the deceleration end condition is satisfied and the exception condition is not satisfied, the deceleration flag Xdec is "0". The deceleration control is not thus executed after the operation on the acceleration operator ends. The travel assist control is restored. That is, after the operation on the acceleration operator ends, the vehicle VA travels at the ACC target acceleration Gacc.

Meanwhile, in a case where the distance D is less than the second distance D2th when the processing proceeds to step 515 (i.e., in a case where the exception condition is satisfied), the CPU determines "Yes" in step 515. The processing proceeds to step 595 and the CPU ends the routine temporarily. As a result, in a case where the deceleration end condition is satisfied and the exception condition is satisfied, the deceleration flag Xdec remains "1". The deceleration control is thus resumed after the operation on the acceleration operator ends.

In a case where the deceleration target DO is recognized based on the image data when the processing proceeds to step 505 (i.e., in a case where the condition 1 is not satisfied), the CPU determines "Yes" in step 505. The processing proceeds to step 595 and the CPU ends the routine temporarily. In a case where the elapsed time T is longer than the threshold time Tth when the processing proceeds to step 510 (i.e., in a case where the condition 2 is not satisfied), the CPU determines "No" in step 510. The processing proceeds to step 595 and the CPU ends the routine temporarily. Thus, in a case where the deceleration end condition is not satisfied, the deceleration flag Xdec remains "1". The deceleration control is thus resumed after the operation on the acceleration operator ends.

According to the present aspect, in a case where the deceleration end condition is satisfied, the deceleration control ends. The vehicle VA thus travels at the ACC target acceleration Gacc after the operation on the acceleration operator ends. In contrast, in a case where the deceleration end condition is not satisfied, the deceleration control does not end. The vehicle VA thus decelerates at the deceleration target acceleration Gdec after the operation on the acceleration operator ends. This makes it possible to decide whether to resume or end the deceleration control in compliance with the intention of a driver operating the acceleration operator. It is therefore possible to make it more likely that travel assist compliant with the intention of a driver operating an acceleration operator is offered.

The embodiment has described the example in which deceleration control is executed when travel assist control is executed, but the present disclosure is not limited to the example. Even in a case where a driver is performing non-automated driving, deceleration control may be started in a case where the deceleration start condition is satisfied. It is to be noted that, even in the case, the deceleration control is ended as in the embodiment if the deceleration end condition is satisfied and the exception condition is not satisfied in a case where the driver operates the acceleration operator during the execution of the deceleration control.

The present apparatus 10 is applicable to a vehicle such as an engine automobile, a hybrid electric vehicle, a plug-in hybrid electric vehicle, a fuel cell electric vehicle, and a battery electric vehicle. Furthermore, it is also possible to grasp the present disclosure as a computer-readable non-transitory storage medium in which a program that implements a function of the present apparatus 10 is stored.

What is claimed is:

1. A vehicle control apparatus that starts deceleration control to decelerate a vehicle in a case where a distance between a deceleration target ahead of the vehicle and the vehicle based on map data is acquired and a deceleration start condition that the distance is less than or equal to a first distance is satisfied, wherein the vehicle control apparatus is configured to accelerate the vehicle based on an operation amount of an acceleration operator of the vehicle and determine whether a deceleration end condition is satisfied in a case where the acceleration operator is operated during execution of the deceleration control, the deceleration end condition including at least a first condition that a time from the start of the deceleration control to the operation on the acceleration operator is less than or equal to a threshold time, end the deceleration control in a case where the deceleration end condition is satisfied, and resume the deceleration control in a case where the operation on the acceleration operator ends in a case where the deceleration end condition is not satisfied.

2. The vehicle control apparatus according to claim 1, wherein the vehicle control apparatus is configured to determine that the deceleration end condition is satisfied in a case where both the first condition and a second condition that the deceleration target is not recognized based on an image are satisfied, the image being captured by a camera mounted on the vehicle.

3. The vehicle control apparatus according to claim 1, wherein the vehicle control apparatus is configured to resume the deceleration control without ending the deceleration control in the case where the operation on the acceleration operator ends in a case where the distance is less than a second distance shorter than the first distance even though the deceleration end condition is satisfied.

4. A vehicle control method for starting, by a computer, deceleration control to decelerate a vehicle in a case where a distance between a deceleration target ahead of the vehicle and the vehicle based on map data is acquired and a deceleration start condition that the distance is less than or equal to a first distance is satisfied, the computer being mounted on the vehicle, the vehicle control method comprising:

accelerating, by the computer, the vehicle based on an operation amount of an acceleration operator of the vehicle and determining, by the computer, whether a deceleration end condition is satisfied in a case where the acceleration operator is operated during execution of the deceleration control, the deceleration end condition including at least a first condition that a time from the start of the deceleration control to the operation on the acceleration operator is less than or equal to a threshold time;

ending, by the computer, the deceleration control in a case where the deceleration end condition is satisfied; and resuming, by the computer, the deceleration control in a case where the operation on the acceleration operator ends in a case where the deceleration end condition is not satisfied.

5. A non-transitory storage medium storing a program that causes a computer to start deceleration control to decelerate a vehicle in a case where a distance between a deceleration target ahead of the vehicle and the vehicle based on map data is acquired and a deceleration start condition that the distance is less than or equal to a first distance is satisfied, the computer being mounted on the vehicle, wherein the program causes the computer to execute accelerating the vehicle based on an operation amount of an acceleration operator of the vehicle and determining whether a deceleration end condition is satisfied in a case where the acceleration operator is operated during execution of the deceleration control, the deceleration end condition including at least a first condition that a time from the start of the deceleration control to the operation on the acceleration operator is less than or equal to a threshold time, ending the deceleration control in a case where the deceleration end condition is satisfied, and resuming the deceleration control in a case where the operation on the acceleration operator ends in a case where the deceleration end condition is not satisfied.

* * * * *